United States Patent [19]

Wilson, III

[11] Patent Number: 4,870,272
[45] Date of Patent: Sep. 26, 1989

[54] TRANSDUCER ADJUSTMENT APPARATUS FOR SHAFT ENCODER

[75] Inventor: Joseph T. Wilson, III, Endicott, N.Y.

[73] Assignee: International Business Machines Corporation, Armonk, N.Y.

[21] Appl. No.: 261,658

[22] Filed: Oct. 24, 1988

[51] Int. Cl.4 .............................................. G01D 5/34
[52] U.S. Cl. ........................... 250/231 SE; 250/237 G
[58] Field of Search ..................... 250/231 SE, 237 G; 340/347 P; 356/395; 33/125 C

[56] References Cited

U.S. PATENT DOCUMENTS

| | | | |
|---|---|---|---|
| 2,859,084 | 11/1958 | Raddin | 360/109 |
| 3,894,232 | 7/1975 | Laspesa | 250/231 |
| 3,936,882 | 2/1978 | Lane, III | 360/104 |
| 3,963,351 | 6/1976 | Chance et al. | 250/231 SE |
| 4,031,441 | 6/1977 | Garrett | 318/480 |
| 4,033,833 | 7/1977 | Zinsmeyer et al. | 250/231 |
| 4,289,962 | 9/1981 | Polloch et al. | 250/231 |
| 4,340,919 | 7/1982 | Kato | 360/109 |
| 4,476,457 | 10/1984 | Kondo | 340/347 |
| 4,625,109 | 11/1986 | Nixon | 250/231 SE |
| 4,647,769 | 3/1987 | Stone et al. | 250/237 G |
| 4,703,176 | 10/1987 | Hahn et al. | 250/231 SE |

FOREIGN PATENT DOCUMENTS 784572 10/1957 United Kingdom ..................... 40/2

OTHER PUBLICATIONS

IBM TDB, vol. 21, No. 4, Sep. 78 P. 1531, Leadscrew Emitter Phase Adjustment Mechanism R. B. Shuman.

Primary Examiner—David C. Nelms
Assistant Examiner—William L. Oen
Attorney, Agent, or Firm—Kenneth P. Johnson; John S. Gasper

[57] ABSTRACT

Apparatus for adjustably positioning a supported transducer in sensing relation with recorded indicia on a shaft encoder in which a first frame portion is fixed and a second movable portion carrying the transducer is attached to the frame portion through a flexure means with the flexure means being on the opposite side of the shaft from the transducer and the movement of the transducer and path of indicia being at the same radius from the center of said shaft substantially decreasing the number of components formerly used, which enables highly accurate adjustments and lends itself to fabrication by molding.

21 Claims, 3 Drawing Sheets

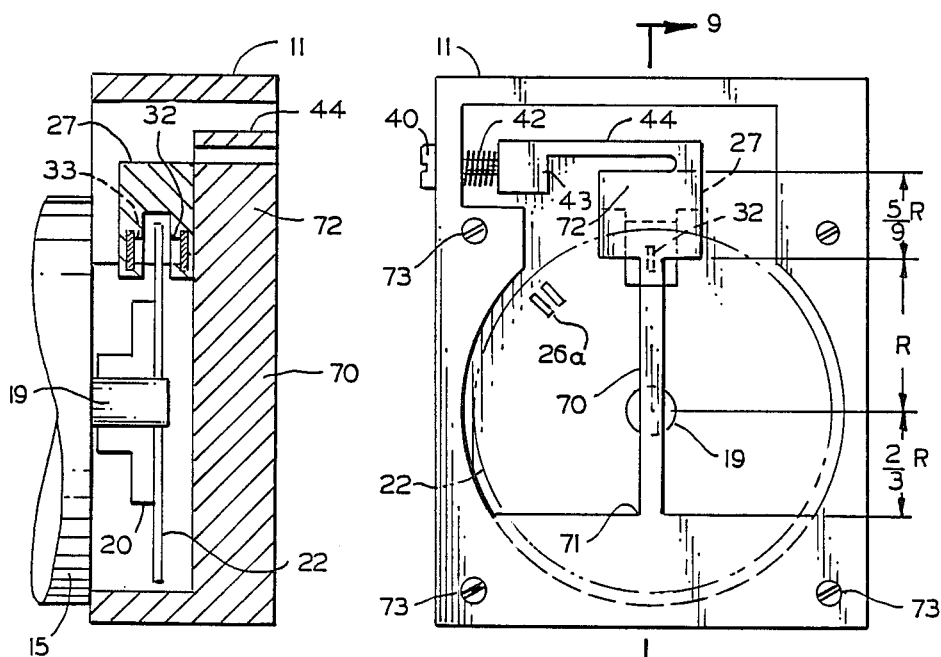
FIG.9
FIG.8
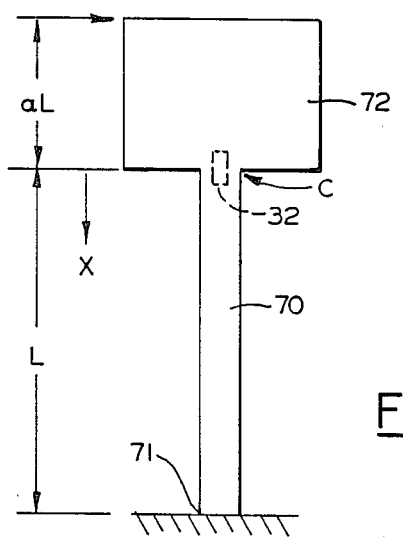
FIG.10

TRANSDUCER ADJUSTMENT APPARATUS FOR SHAFT ENCODER

BACKGROUND OF THE INVENTION

This invention relates generally to adjustment apparatus for transducers used for detecting indicia on a moving surface and, with greater particularity, to flexure apparatus for enabling improved accuracy and convenience in adjusting the relationship between an encoded disk on the shaft and the transducing device sensing the disk indicia.

The motion or position of rotating shafts are usually detected by sensing recorded indicia on disks on the shafts that effect a change in the transmission of light or intensity of magnetic flux as the disks move past stationary sensing transducers that typically produce electrical output signals whose amplitude is in proportion to the transmitted light or magnetic field. To sense smaller and smaller increments of motion, represented by correspondingly finer indicia, it is necessary to detect these recorded indicia by careful and stable adjustment of the transducing devices relative to the rotatable disks. The output signals representing the recorded indicia must be reproduced with optimum definition to enable the desired and necessary accuracy.

Adjustment of the position of a non-rotating, stationary transducing device or its optical aperture relative to its disk requires consideration of several factors: to maximize signal strength from the transducer or sensing device, the adjusted transducer or aperture must remain at the same radius from the center of the rotating shaft as the centerline of the disk indicia; during changes in position an adjusted transducer or aperture must be moved by uniform forces to avoid irregular changes in position; the transducer or its aperture should be isolated from variable external forces encountered during the adjustments; the adjustment mechanisms are preferably insensitive to temperature changes and external vibration during operation; and adjustment mechanisms should be made of few components for accuracy, reliability and minimum expense.

Techniques of achieving the proper relationship between a disk and transducer encompass several approaches. A coarse technique often used varies the disk position by hub movement; in U.S. Pat. Nos. 4,033,833 and 4,476,457 the disks are positioned with uncertainty by loosening set screws and moving the disk hubs, while in U.S. Pat. No. 4,289,962 disks are selectively rotated against frictional restraint. Better accuracy is obtained, however, by adjusting the transducer support. Examples are shown in U.S. Pat. Nos. 3,894,232 and 4,031,444 and in "Leadscrew Emitter Phase Adjustment," R. B. Schuman, IBM Technical Disclosure Bulletin, Vol. 21, No. 4, pg. 1531, Sept. 1978. In these, multiple piece mechanisms have been devised that permit finer changes in the transducer support position. These devices maintain the necessary constant radial dimension but require multiple components and assembly and are subject to displacing forces during adjustment and to positional uncertainty due to bearing clearances.

Another adjustment technique has been the use of flexure members that provide a smoother transition between positions. This method has been often used to obtain the required positioning of magnetic transducers because of the ease and rapidity with which banks of transducers can be properly located. Such arrangements are shown in U.S. Pat. Nos. 2,859,084 and 3,936,882 and in United Kingdom Pat. No. 784,572. Although of simpler construction, the mechanisms have not been devised for optical transducers nor maintenance of radial dimension, protective isolation from disturbing forces, and insensitivity to differential coefficients of expansion.

OBJECTS AND SUMMARY OF THE INVENTION

It is accordingly a primary object of this invention to provide an adjustment apparatus for an optical transducer that has improved accuracy and reliability in achieving and maintaining the position of the transducer in relation to an encoder disk.

Another important object of this invention is to provide adjustment apparatus for positioning an optical transducer relative to its rotating encoder disk using a transducer holder supported on a base by one or two flexure members that, in turn, enable an attached transducer to be adjusted along the encoder track at the same radius from the center of the disk shaft as the sensed indicia.

Yet another important object of this invention is to provide adjustment apparatus for an optical transducer that can be fabricated as a unitary component requiring subsequent attachment of only the transducer, clamping means for holding its wire leads, and a spring-loaded adjustment screw.

A further object of this invention is to provide apparatus for adjusting the position of an optical transducer in relation to its encoder indicia that provides a neutral axis coincident with the neutral axis of the encoder disk or its rotating driver for expansion or contraction during temperature excursions.

The foregoing objects are attained in accordance with the invention by providing adjustment apparatus comprising a unitary structure having an outer frame or first portion that is attached or fixed on the driver whose shaft is rotating an encoder disk, and an inner or second portion attached to the first portion by flexure means on one side of the shaft and carrying the sensing transducer and its aperture or window on the opposite side of the shaft. This arrangement forms a linkage system enabling a limited range of adjustment movement by rotation of a screw to vary the position of the second portion at its transducer sensor area along an apparent radius coincident with the path of indicia on the moving disk and in a plane parallel with the rotational plane of the disk, but with the attachment of the flexure means actually at a more extended radius on the opposite side of the shaft.

The invention has several significant advantages: it has fewer components; it can be molded of polymeric materials or cast, machined, or formed of metals as a unitary device with three or fewer added components; it can be attached to the shaft driver such that it possesses a neutral axis unaffected by ever-present temperature variations; and it provides a protective recess for the disk. The elimination of numerous components used in known devices permits significant cost reduction in manufacture, decreases assembly time and improves dimensional stability. Reductions are also obtained in manufacturing tolerances and clearances, and in the number of components typically used to compensate for backlash and tolerances. Further, this invention is unaffected by extraneous adjustment forces. Devices disclosed in the prior art also frequently require that the ends of adjusting screws slide on contact surfaces so that their function cannot be assured; in the invention, this frictional contact is not required and simple screw rotation achieves only the intended change.

A further feature of the invention resides in the mounting of the frame portion wherein its attachment is performed at the same distances from the shaft on either side of a line passing through the transducer sensor surface and the flexure means. This equality enables expansion or contraction due to temperature coefficient to occur substantially identically in the frame portion on either side of the critical transducer-flexure member axis of symmetry. This axis remains at its designated position regardless of ambient temperatures.

The foregoing and other objects, features and advantages of the invention will become apparent from the following more particular description of preferred embodiments of the invention considered in conjunction with the accompanying drawing.

BRIEF DESCRIPTION OF THE DRAWING

FIG. 8 is an elevation view of an alternate embodiment of the apparatus of FIG. 1 showing a single flexure member;

FIG. 9 is a sectional view taken along line 9—9 in FIG. 8; and

FIG. 10 is a diagram of the geometrical relationships of the adjusting portions of the mechanism of FIGS. 8 and 9.

DETAILED DESCRIPTION OF THE INVENTION

Figure 1:
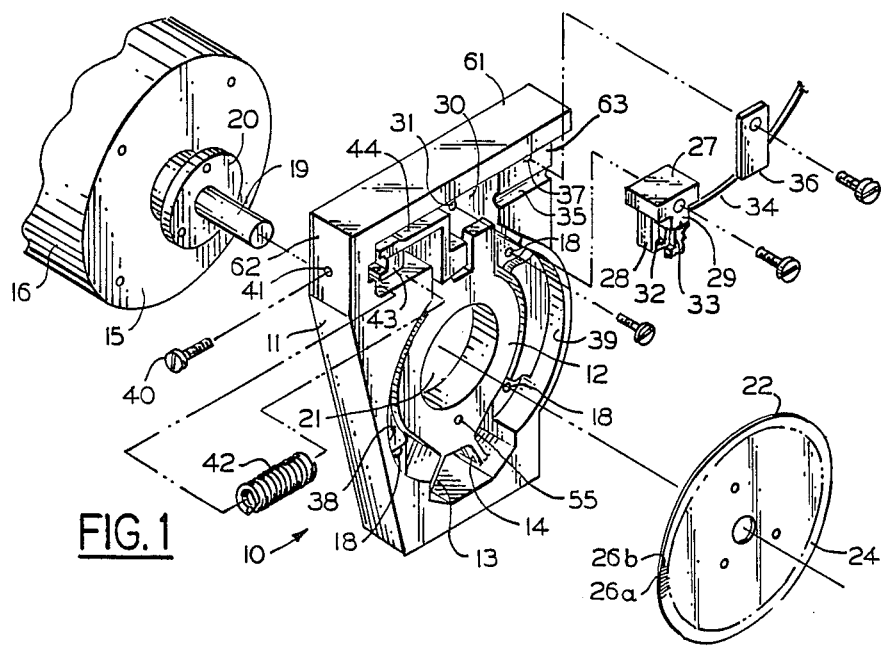
FIG. 1 is an exploded perspective view of the transducer adjustment apparatus constructed in accordance with the principles of a preferred embodiment of the invention.
Figure 2:
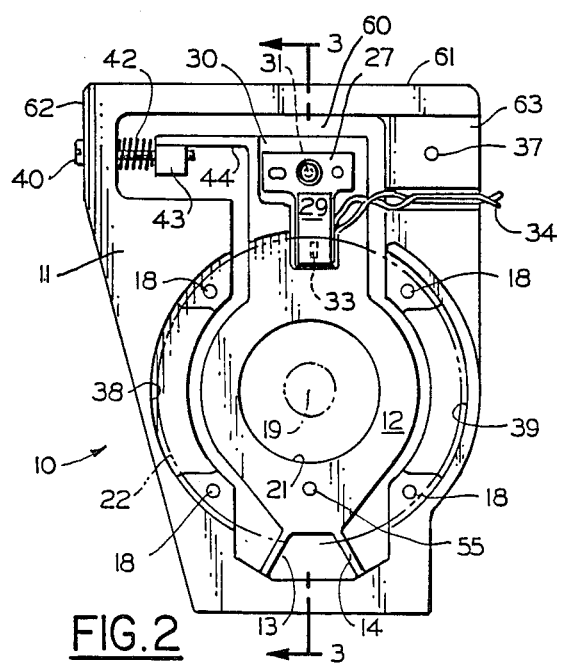
FIG. 2 is a front elevation view of the transducer adjustment apparatus shown in FIG. 1.
Figure 3:
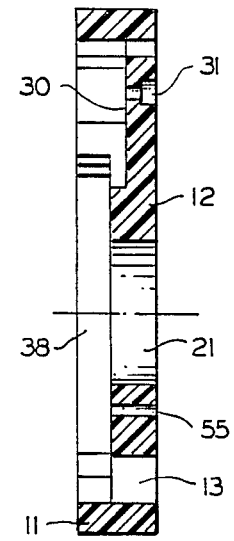
FIG. 3 is a sectional view of the apparatus of FIG. 2 taken along the line 3—3 but omitting the transducer.

Referring to FIGS. 1-3, adjustable transducer mount 10 of the invention generally comprises rigid frame portion 11, movable portion 12 enclosed within the frame portion, and flexible links 13 and 14 connecting movable portion 12 with its frame portion. The frame portion is secured to end bell 15 of drive motor 16 by screws through recessed openings 18. Motor shaft 19 carries hub 20 secured thereon and both extend through opening 21 of movable portion 12 of the transducer mount.

An emitter disk 22 is secured to the face of hub 20 by screws and carries, when used with an optional encoder as shown, a band of optical indicia that are light transmissive areas 26a separated by opaque, light blocking areas 26b. An optical transducer assembly 27 has depending legs 28 and 29 that straddle disk 22 and is secured at aligning recessed surface 30 by a screw engaging opening 31 near the top of movable portion 12 of transducer mount 10. One of legs 28, 29 carries a light source (not shown), such as a light emitting diode and the other carries photosensor transducing means such as a light sensing diode (also not shown). Each leg is formed with an aperture 32, 33 to direct light from the source to aligned band 24 of transmissive areas 26a and blocking areas 26b to ultimately strike the aligned photosensor as disk 22 rotates to sense increments of shaft rotation or displacement. Although an optical emitter sensor is described, a magnetic pulse emitting arrangement can also be used. Leads 34 to transducer assembly 27 are clamped in recess 35 of frame portion 11 by plate 36 and a screw in opening 37. Movable portion 12 of the mount is thinner than frame portion 11 along the axis of the motor shaft to provide a recess for rotatable disk 22 and its protection by flanges 38 and 39 on frame portion 11.

A change in the relative position between frame portion 11 and movable portion 12 in a plane parallel to that of the disk rotation is made by screw 40, which passes through clearance hole 41 in frame 11, and compression spring 42 and threadedly engages tab 43 depending from thin, flexible web 44 of movable mount portion 12. Spring 42 is compressed in its installed position, frictionally restraining unwanted rotation of screw 40.

For adjustment of the position of transducer assembly 27 and its transducer and aligned apertures 32, 33 relative to the light transmissive elements 26a in band 24 of disk 22 and relative to frame portion 11, screw 40 is turned clockwise or counterclockwise a desired amount to attain the required position. This adjustment stresses flexible links 13 and 14 resulting in an apparent rotation of the transducer apertures 32, 33 about the center of motor shaft 19. Any adjustment thus moves the transducer and its apertures at the same effective radius as that of the optical emitter areas 26a and 26b although flexible links 13 and 14 are on the opposite side of shaft 19 from the apertures and at a longer radial distance than the disk radius. The complete enclosure about the periphery of movable portion 12 by fixed frame portion 11 isolates the former from extraneous forces during adjustment by the rotation of screw 40 against fixed frame 11 and enables a stable, finer and more accurate degree of adjustment among the transducer, its apertures and the light transmissive elements.

Figure 4:
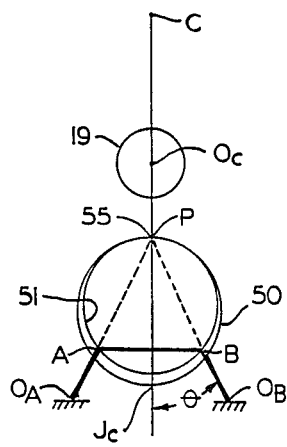
FIG. 4 is a diagram of the geometrical relationships required in a determination of the effects of pivoted linkage on the apparent center of rotation of the adjustment apparatus.

The location of the apparent center of rotation of the transducer and apertures 32, 33 about the center of shaft 19 is obtained through the analysis of the four bar linkage arrangement that is illustrated geometrically in FIG. 4. Link $O_AA$ is equivalent to flexure link 13 in FIG. 1 and link $O_BB$ is equivalent to flexure link 14. Rigid frame portion 11 forms the base $O_A$-$O_B$ while movable portion 12 forms the link A-B. Coupler A-B moves on cranks $O_AA$ and $O_BB$ with fixed points $O_A$ and $O_B$. As the cranks rotate, points on the coupler trace paths known as coupler curves. Extensions of crank centerlines intersect at pole P, also shown in FIGS. 1 and 2 as point 55 on an axis of symmetry through the centers of shaft 19 and apertures 32, 33. Inflection circle 50 is the locus of all points on the coupler whose coupler curves have an infinite radius of curvature in the position shown.

The equation of Euler-Savary, described in "Kinematics and Linkage Design" by A. S. Hall, Jr., Prentice Hall, Inc., 1961, gives the relationship between a point on inflection circle 50, a point of known radius of curvature, such as crank end A, the center of curvature of this point $O_A$ and pole P. The equation of Euler-Savary for the curvature of the coupler curve at arbitrary point D on the coupler is given as $$O_DD = (PD)^2/J_DD \quad (1)$$

which transposes to provide a location on inflection circle 50, $J_D$, as $$J_DD = (PD)^2/O_DD \quad (2)$$

Directed line segment $J_DD$ has the same sense as segment $O_DD$. Proper substitution of PA and $O_AA$ and then PB and $O_BB$ into equation (2) yields points $J_A$ and $J_B$ on inflection circle 50 that passes through these three points.

Stationary curvature denotes that the rate of change of curvature is equal to zero; the cubic of stationary curvature 51 defines points whose coupler curves have no change in radius of curvature. One form is given as $$\frac{1}{PD} = \frac{1}{M\cos\theta} - \frac{1}{N\sin\theta} \quad (3)$$

M and N are determined from polar locations of crank ends A and B that have stationary curvature. If the linkage is symmetrical about the normal to pole P, then
 M=PA/cos$\theta$
 N=$\infty$
Hence, the cubic of stationary curvature of symmetrical linkage degenerates to the pole normal and a circle of diameter PA/cos$\theta$ as shown. Because the path of the transducer and its apertures 32, 33 (FIG. 1) lie on a circle during adjustment, the center of the sensor apertures will be located on the cubic of stationary curvature 51. It is not necessary to use a symmetrical linkage. However, to simplify the design process, guiding links 13 and 14 (FIG. 1) are made symmetrical and the center of the apertures lies on the pole normal which is also the axis of symmetry.

Point of interest C, at the transducer and aperture location, can bear three relationships to pole P and $J_C$. These are illustrated in FIGS. 5a, 5b and 5c where point C is greater than zero and farther from P than $J_C$ (FIG. 5a), or point C is greater than zero but closer to P than $J_C$ (FIG. 5B) or point C is equal to or less than zero (FIG. 5C).

Figure 5A:
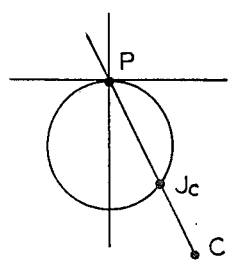
FIGS. 5a, 5b and 5c are diagrams of geometrical relationships for the development of a mechanism with pivoted joints.

For FIG. 5a  $J_CC = PC - PJ_C$ (4a)

Figure 5B:
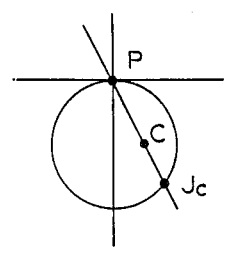

For FIG. 5b  $J_CC = J_CP - PC$ (4b)

Figure 5C:
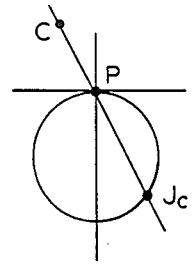

For FIG. 5c  $J_CC = J_CP + PC$ (4c)

The radius of curvature of point C is $O_CC$ and is positive if $O_C$ is on the same side of C as P. When equations (4a), (4b) and (4c) are substituted into equation (1) and the results normalized by chord $J_CP$ of inflection circle 50, with c representing $PC/J_CP$ and r representing the normalized distance from the pivot or $O_CC/J_CP$, the following equations for the normalized radius of curvature of point C result:

$$r = c^2/(c - 1) \quad \text{for } c \text{ greater than } J_C \text{ and } J_C \text{ equal to or greater than 0} \quad (5a)$$

$$r = c^2/(1 - c) \quad \text{for } c \text{ greater than 0 and less than } J_C \quad (5b)$$

$$r = c^2/(c + 1) \quad \text{for } c \text{ equal to or less than 0} \quad (5c)$$

Figure 6:
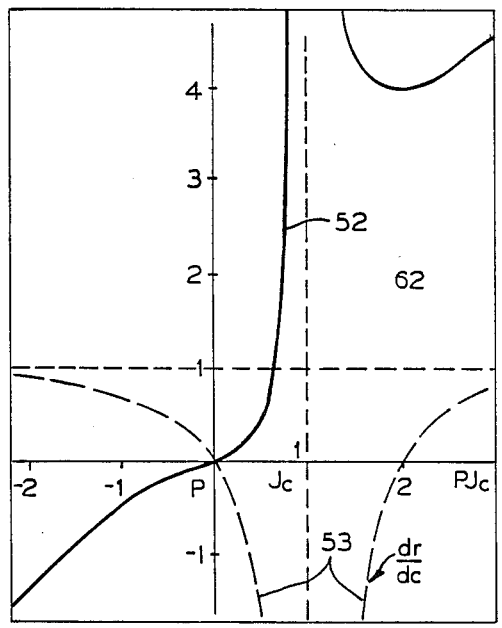
FIG. 6 is a diagram of both the radius of curvature of a point with respect to its distance from the pole and the rate of change of curvature with respect to distance from the pole for a pivoted linkage.

These equations encompass the domain of the equation of Euler-Savary and give the curvature of any point when the inflection circle is known. In FIG. 6, the curvature of coupler paths is represented by solid line 52. Broken lines 53 represent the derivative of r with respect to c, dr/dC, which is the rate of change of curvature with respect to the distance from the center of curvature. The following equations result:

$$dr/dc = (c^2 - 2c)/(c - 1)^2 \quad \text{for } c \text{ greater than } J_C \text{ or 0} \quad (6a)$$

$$dr/dc = (2c - c^2)/(c - 1)^2 \quad \text{for } c \text{ between } J_C \text{ and 0} \quad (6b)$$

$$dr/dc = (c^2 + 2c)/(c + 1)^2 \quad \text{for } c \text{ less than 0} \quad (6c)$$

Both the equation of Euler-Savary, equation (1), and the "cubic of stationary curvature" equation (3) consider the motion of points only and would define guiding linkage geometry for a circularly moving transducer or aperture. For the transducer apertures 32, 33 to pivot about the center of disk 22 (FIG. 1), the rate of change of curvature of the center of the apertures should be one. Because the rate of change of curvature asymptotically approaches one, this desired value cannot be obtained with a practical linkage. Therefore, a necessary compromise requires a solution where dr/dc is other than one. Linkage designs with adequate crank length and clearance between the crank ends and disk center occur in the region where c is less than zero. A symmetrical linkage with the following relationships (FIG. 4) was selected.
 PC/PJ$_C$=1.5
 PA/AO$_A$=1.5
 CO$_C$/O$_C$P=1.5
 $\theta$=30 degrees Although the geometrical arrangement is determined with pivoted cranks, flexure linkages are more desirable. Their introduction, however, requires that the flexure links have identical lengths 1.2 to 1.25 times that of the shorter rigid cranks, as determined empirically, to obtain the same coupler motion. The extended center lines of links 13 and 14 (FIG. 1) intersect at pole P or point 55 and the center of transducer apertures 32, 33 becomes point C.

Transducer mount 10, as shown in FIG. 1, is preferably constructed as a molded unit that comprises rigid frame portion 11, movable adjustment portion 12 and flexure links 13 and 14. This permits achievement of minimum fabrication cost. A suitable material is polycarbonate containing approximately ten percent glass fiber filler to reduce creep. If not molded, the mount can be machined from a single block or fabricated as an assembly of several parts of similar or diverse materials.

In construction, the center of apertures 32, 33, the center of shaft 19 and point 55 representing the intersection of extensions of links 13 and 14 lie on a common line representing the axis of symmetry. The position of the movable portion 12 of the mount is in a free, unstressed position on this line at fabrication and is diverted when adjusted for aligning the apertures relative to the disk. Rigid frame portion 12 also preferably has mounting openings 18 symmetrically disposed relative to the neutral axis of symmetry. When so mounted, expansion or contraction of frame 12 due to temperature changes produces movement on either side of the axis of symmetry with negligible effect on the adjusted position.

It will be noted in FIGS. 1 and 2 that movable mount portion 12 has a relatively large threaded tab 43 engaged by adjustment screw 40. The tab is integrally attached to thin web 44 that connects with movable portion 12 of the mount at block 60. The thin web flexes and allows the tab to move radially with respect to the screw and change its angular position relative to portion 12 as the screw is rotated. Although a conventional screw 40 is shown, it can be a differentially threaded screw engaging threads in both portions 11 and 12 of different pitches to provide a finer adjustment. The presence of an outer frame portion 11 about movable mount portion 12 adds frame rigidity and protection during adjustment and machine assembly by blocking extraneous forces.

Figure 7:
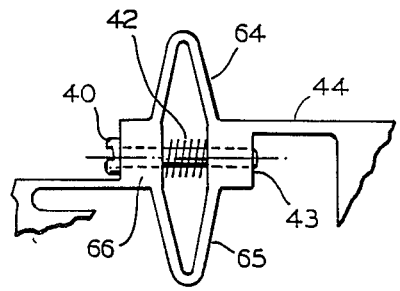
FIG. 7 is a modification of the adjusting portion of the mechanism shown in FIGS. 1-3.

The top element 61 interconnecting the two vertical sides 62, 63 can be eliminated, if desired, and compound flexible links 64 and 65 added as shown in FIG. 7 to stabilize the adjustment webs. These links join frame side 62 and its tab 66 with tab 43 and add rigidity across the adjusting screw.

An alternative embodiment of the transducer mount of the invention is described in FIGS. 8, 9 and 10. This embodiment uses a single, flexure member for supporting the sensing transducer and is useful when the encoder shaft projects only a short distance from the encoder disk, since the flexure member extends across the longitudinal axis of the shaft. In the description, components common to the embodiment of FIGS. 1, 2 and 3 have the same reference numerals.

Referring to FIGS. 8 and 9, a single, rectangular flexure member 70 is secured at its lower fixed end 71 to frame portion 11. The flexure member is coincident with the vertical axis of symmetry and passes across the end of shaft 19. At its top free end, flexure member 70 carries non-flexing mounting block 72, to which is secured transducer assembly 27 whose apertures 32, 33 are aligned with the path of light transmissive areas 26a. Frame portion 11 is secured to motor 15 or its mount by fastening means 73 symmetrically arranged about the axis of symmetry. Mounting block 72 has attached web 44 carrying tab 43 that is engaged by adjusting screw 40 and spring 42. The screw head engages the side of frame 11. Through appropriate rotation of the screw, flexure member 70 and the attached transducer assembly are arcuately moved along the same path traversed by light transmissive areas 26a. Frame portion 11 surrounds the flexure member, its block and adjusting means. When the dimension of the flexure member from the shaft center to the center of aperture 32 or C is R, then that distance from the center of shaft 19 to the member attachment point 71 is 2R/3, as in FIG. 8. The relative length of non-flexing block 72 is 5R/9, also shown in FIG. 8. The centerline of screw 40 provides an adjusting force F and is resiliently connected to non-flexing transducer mount 72 to compensate for the rotation and displacement between the mount and frame portion 11.

The geometric relationships of this embodiment are illustrated in FIG. 10 where L is the length of rectangular flexure member 70 and F is the adjusting force applied at a distance aL from the end of the beam. The transducer sensing area is designated C. The bending moment at distance x along the beam is $F(aL+x)$. The customary differential equation for deflection of a cantilever beam can be solved to yield the slope S and displacement d of point C $$S = \frac{F}{EI}\left(aL^2 + \frac{L^2}{2}\right) \tag{7}$$

$$d = \frac{F}{EI}\left(\frac{aL^3}{2} + \frac{L^3}{3}\right) \tag{8}$$

Here E is the flexural modulus of the beam and I is its area moment of inertia. The apparent radius of curvature, R, of point C is $$R = \frac{d}{S} = \frac{3aL + 2L}{6a + 3} \tag{9}$$

In a similar manner, the radius of curvature can be determined for points on the extended centerline of the beam other than C.

A simplified adjusting mechanism has been described for more accurately varying the timing relation between a rotating shaft encoder and its sensor through a simple screw adjustment. The invention has eliminated many components heretofore believed necessary in such a structure, and the disclosed structure can be molded with minimal cost to eliminate those excess components and their accompanying tolerances and clearances that have prevented close positional control. Moreover, adjustment accuracy to within 0.01 mm is achieved over a range exceeding five degrees along the path of the moving indicia.

While the invention has been particularly shown and described with reference tb a preferred embodiment thereof, it will be understood by those skilled in the art that changes in form and details may be made therein without departing from the spirit and scope of the invention.

What is claimed is:

1. Apparatus for adjustably supporting a device for movement along a path described by an element rotated about a shaft at a fixed radius from the center thereof comprising:
a member having a first portion fixedly mounted relative to said element and a second, movable portion having means thereon for supporting said device adjacent to the path of said element and attached to said first portion by flexure means establishing an apparent center of rotation coincident with said shaft center and parallel with the plane of motion of said element; and
means for adjustably moving said second portion relative to said first portion by stressing said flexure means to arcuately displace said device along said path.

2. Apparatus as described in claim 1 wherein said flexure means and said supported device lie on opposite sides of said shaft.

3. Apparatus as described in claim 1 wherein said flexure means comprises a pair of flexure members.

4. Apparatus as described in claim 1 wherein said first portion, said second portion and said flexure means are a homogeneous structure.

5. Apparatus as described in claim 4 wherein said homogeneous structure is molded from a thermoplastic polymer.

6. Apparatus as described in claim 3 wherein the longitudinal axes of said flexure members are straight lines when said members are unstressed and are angularly disposed such that extensions of said axes intersect on a line passing from the center of said device through the center of said shaft with said intersection and said device being at opposite ends of said line.

7. Apparatus as described in claim 1 wherein the center of said device and center of said shaft form an axis of symmetry and said flexure means comprises a pair of flexure links having longitudinal axes whose extensions intersect on said axis of symmetry.

8. Apparatus as described in claim 7 wherein said intersection and said device center lie on opposite sides of said shaft.

9. Apparatus as described in claim 8 wherein the distance from the center of said shaft to the center of said device is approximately one and one half times the distance from said shaft center to said intersection.

10. Apparatus as described in claim 1 wherein said first portion includes flange means substantially surrounding the periphery of the rotational path of said element.

11. Apparatus as described in claim 1 wherein said adjustable means comprises a rotatable threaded component extending between an unthreaded opening in said first portion and threaded opening in said second portion.

12. Apparatus as described in claim 11 wherein said second portion is formed with a threaded body connected with said component through a flexible beam.

13. Apparatus as described in claim 12 wherein the motion of said second portion at said flexible beam is not co-linear with the axis of said threaded component during said adjustment.

14. Apparatus as described in claim 1 wherein said adjusting means comprises screw means having two threads of different pitches engaging correspondingly threaded openings in said first portion and said second portion.

15. Apparatus as described in claim 11 wherein a part of said threaded component lies within a compressing spring between said first and second portions.

16. Apparatus for adjustably supporting a device for sensing indicia on an element moving along a path at a fixed radius from the center of a rotatable shaft comprising:

a member having a rigid first portion fixedly secured relative to said shaft and a second movable portion carrying said device in co-operative relation with said indicia, said second portion being attached to said first portion by linkage means establishing an apparent center of rotation of said sensing device coincident with that of said indicia and said element with the centers of said shaft and said sensing device forming an axis of symmetry in an unstressed state said linkage means and said device lying on opposite sides of said shaft; and means for deflecting said linkage means to move said second portion relative to said first portion to arcuately move said sensing device along said path.

17. Apparatus as described in claim 16 further including means for fixedly securing said first portion relative to said second portion and said linkage means being symmetrically disposed about said axis of symmetry.

18. Apparatus as described in claim 16 wherein said first portion surrounds the periphery of said second portion and said linkage means.

19. Apparatus as described in claim 16 wherein said linkage means includes a pair of flexure members connecting said first and second portions and having longitudinal axes whose extensions intersect at a plane passing through said axis of symmetry normal to the plane of rotation of said element.

20. Apparatus as described in claim 16 further including auxiliary sensing means attached to said first portion for sensing said indicia.

21. Apparatus as described in claim 16 further including securing means for fixedly mounting said first portion with said securing means being symmetrically disposed on either side of said axis of symmetry.

* * * * *